UNITED STATES PATENT OFFICE.

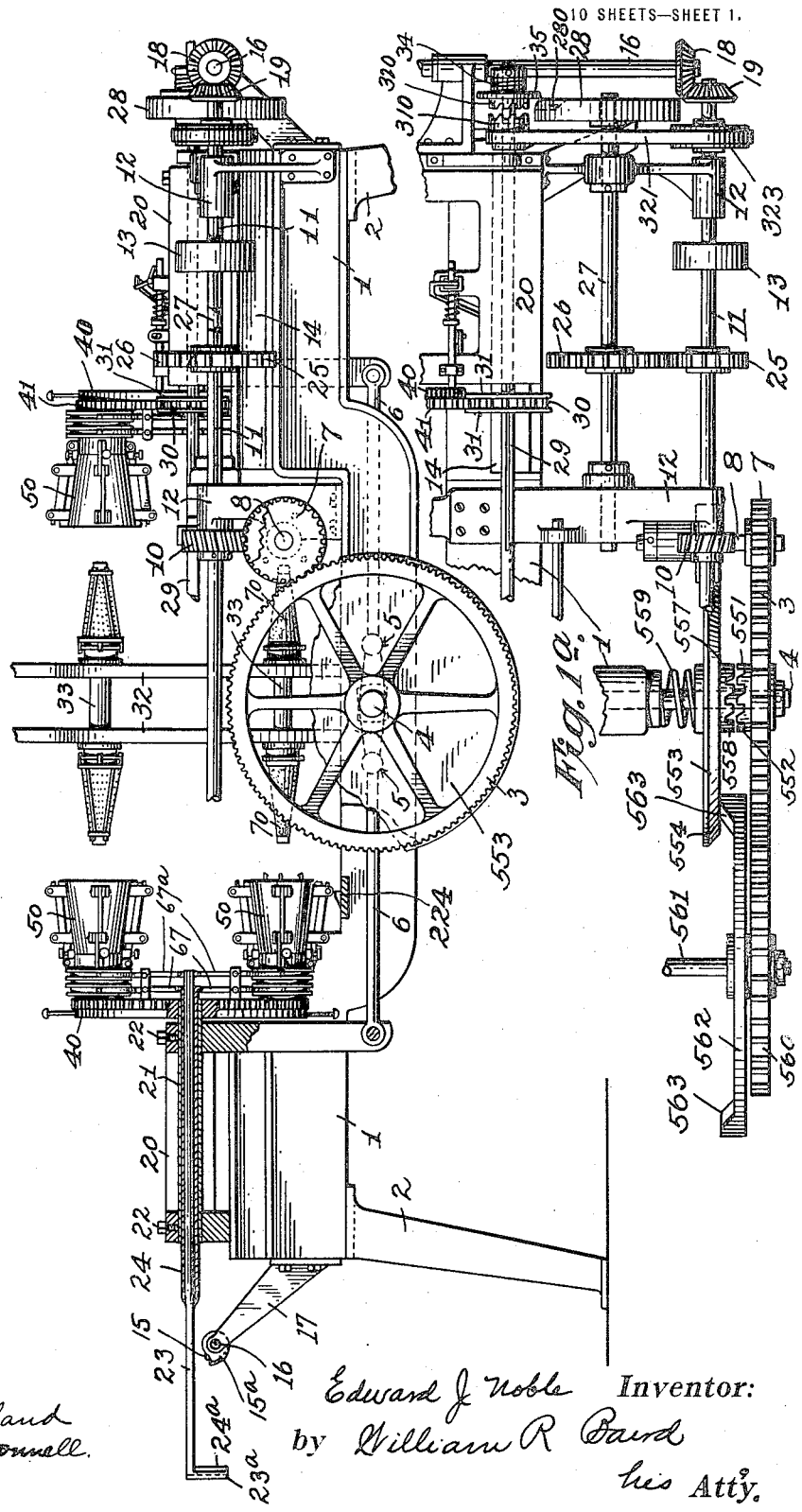

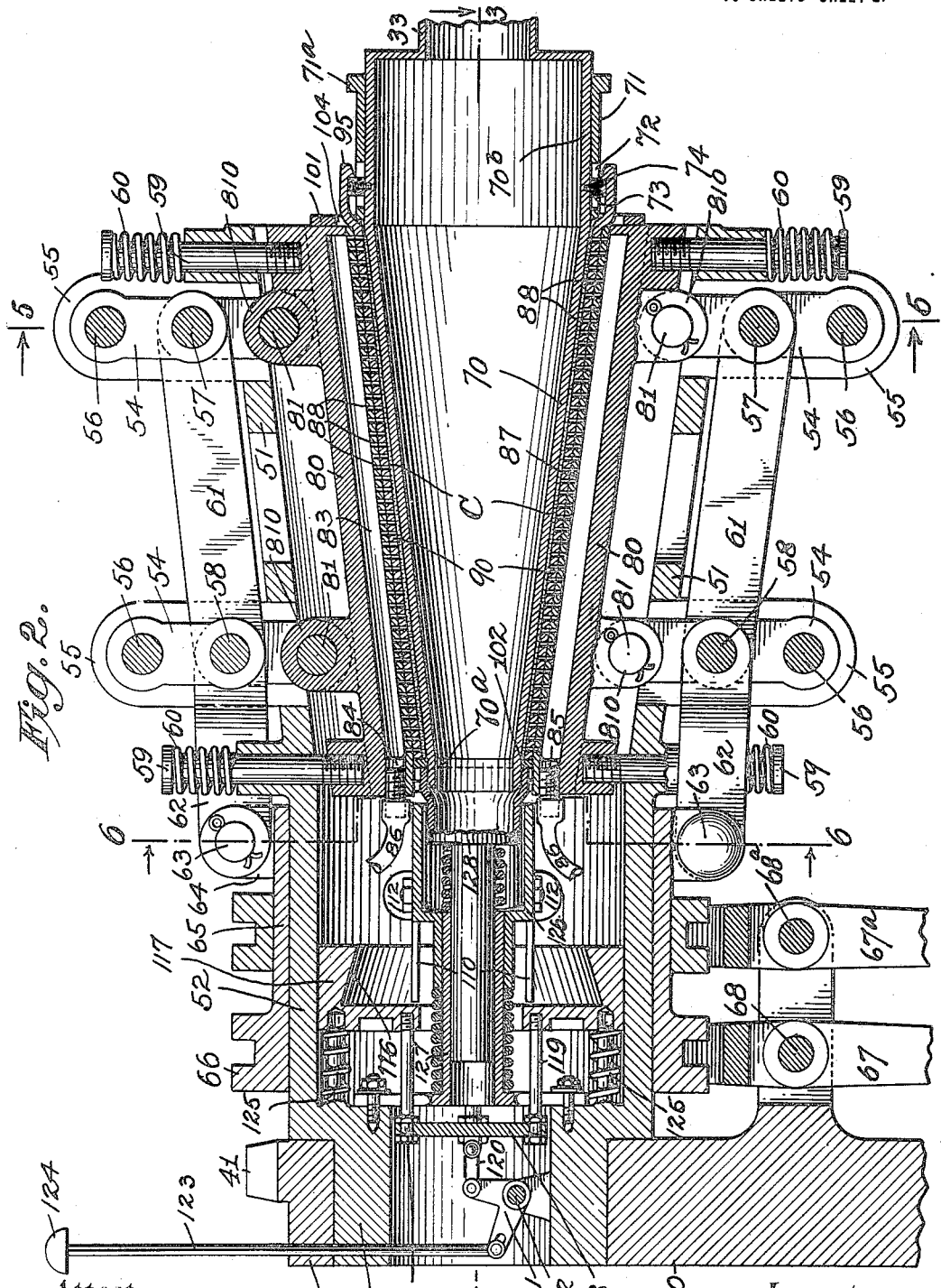

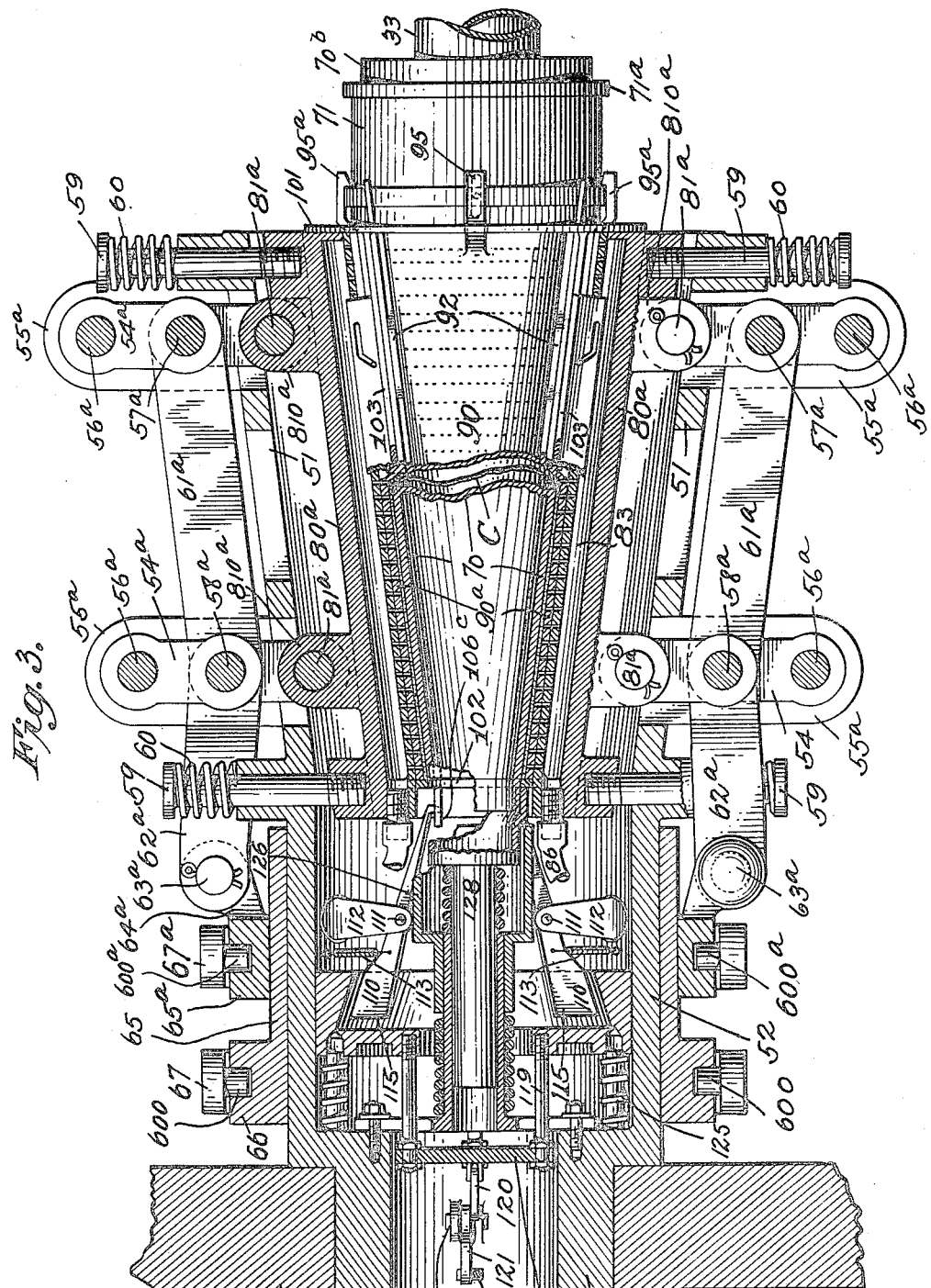

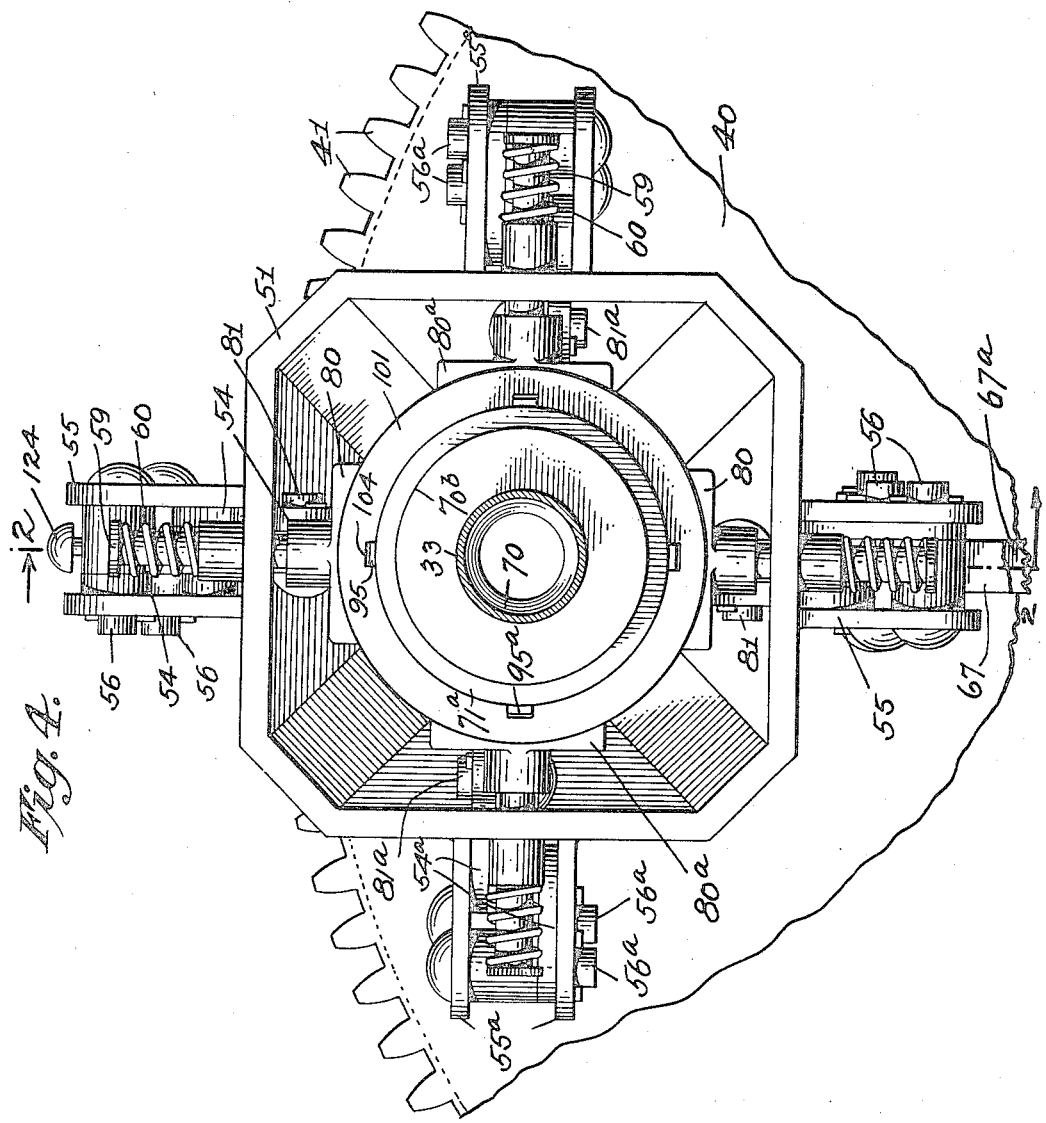

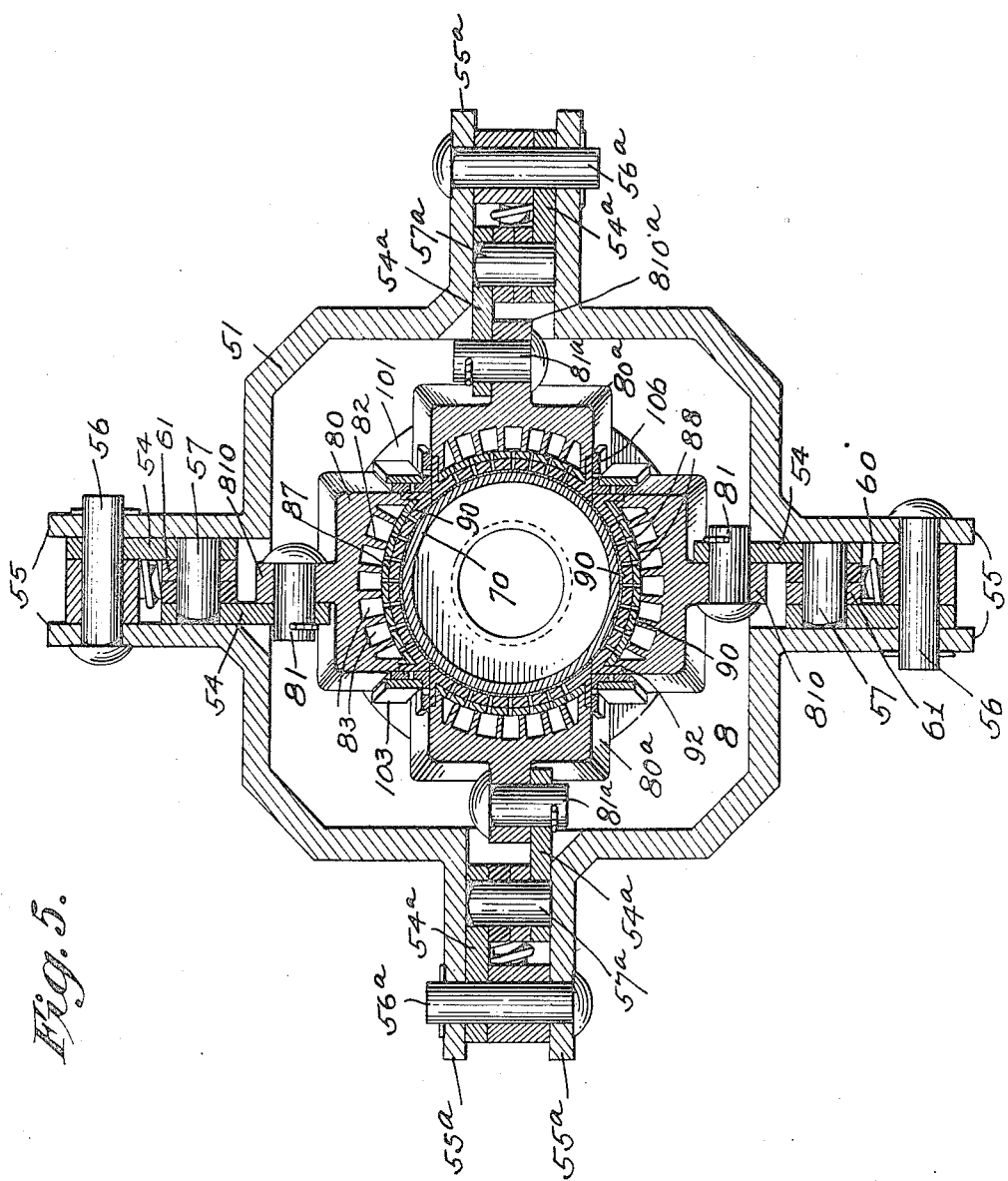

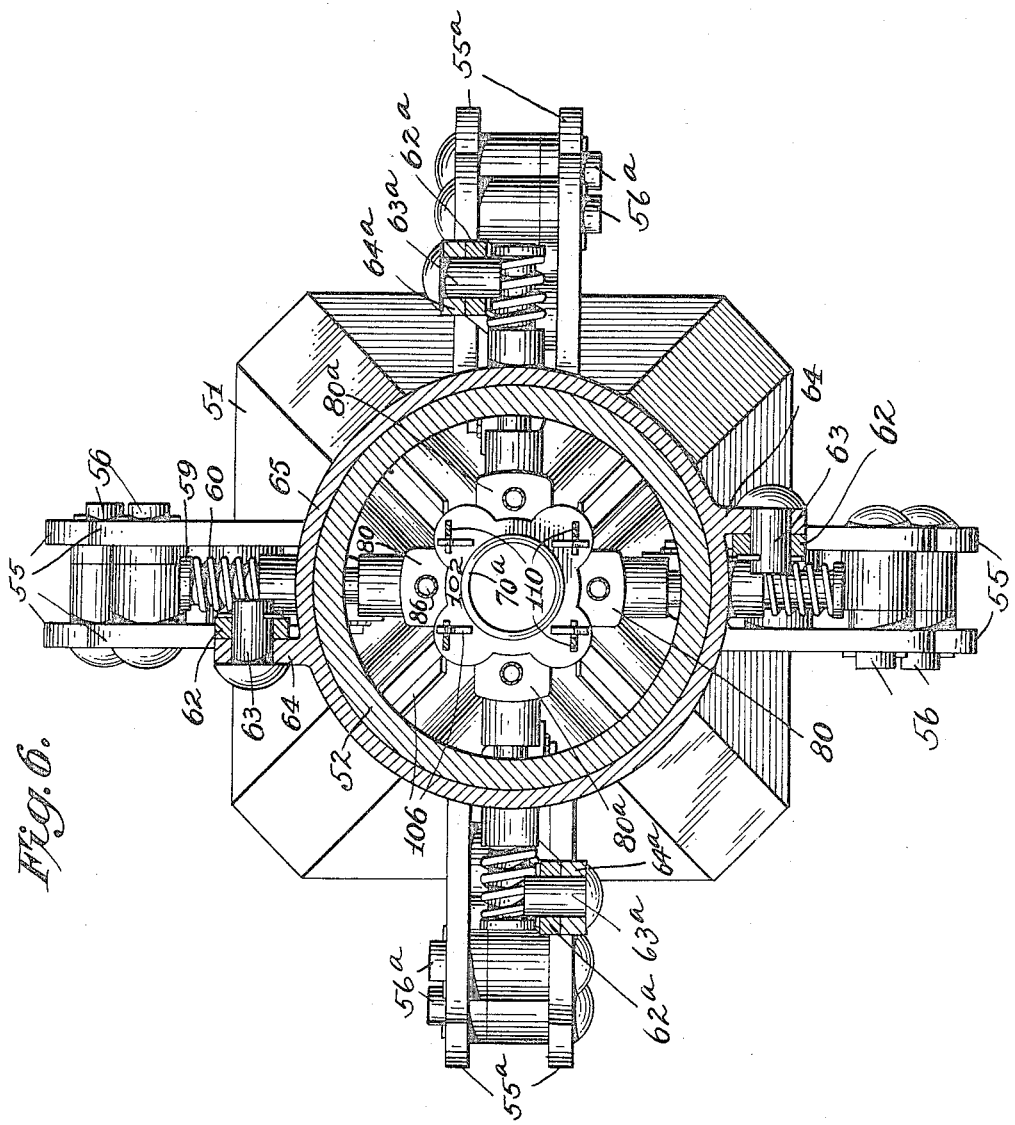

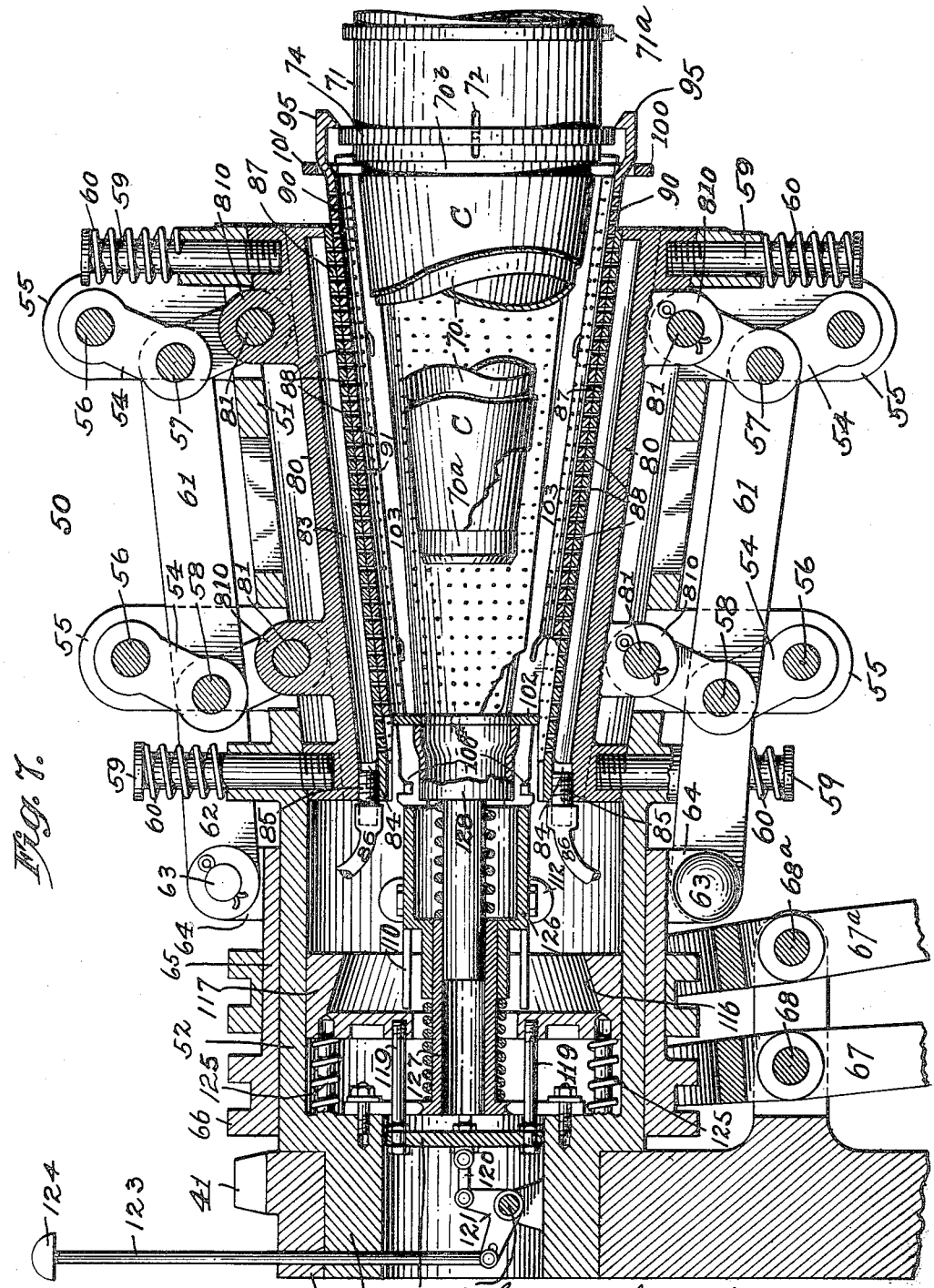

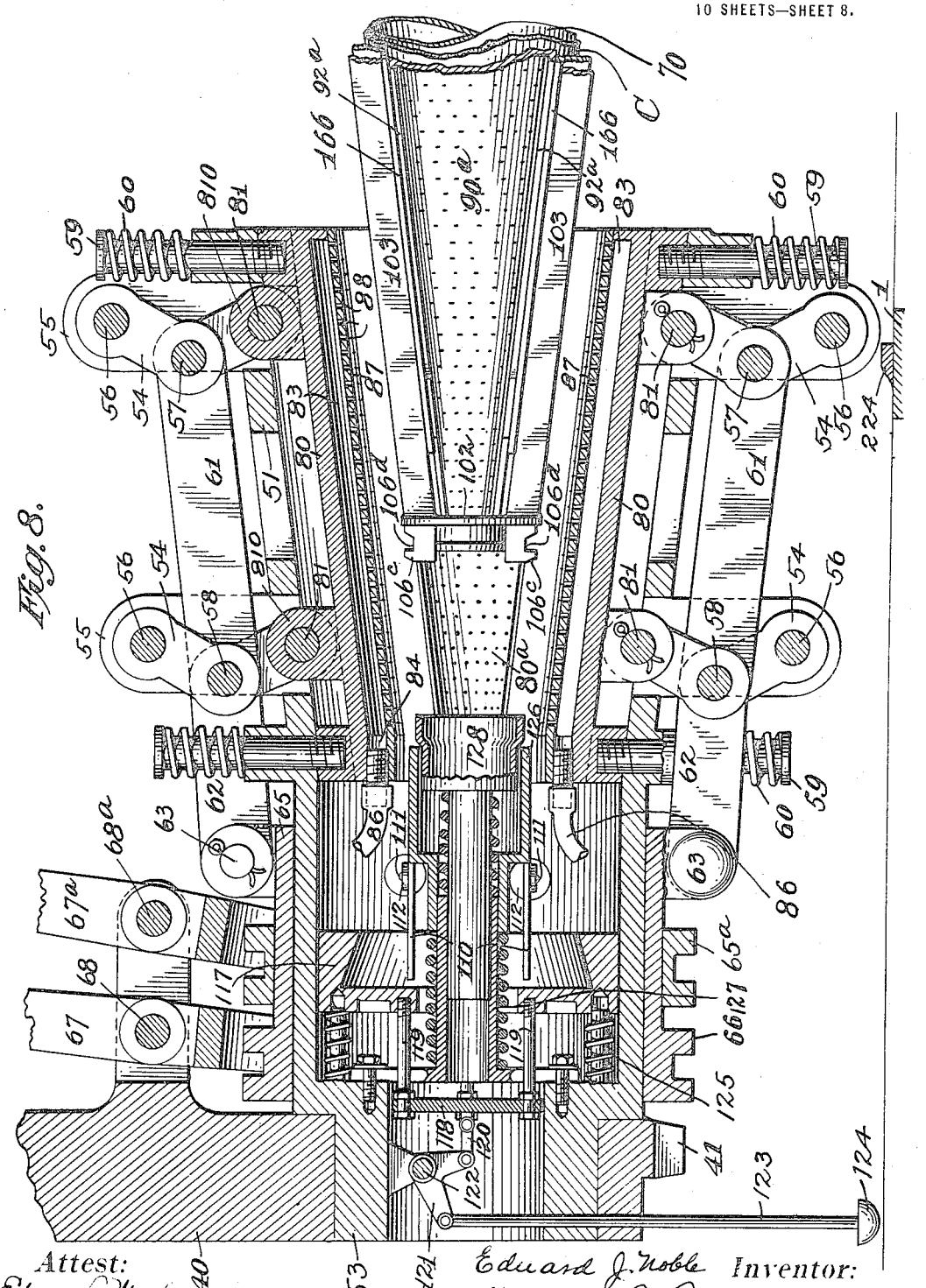

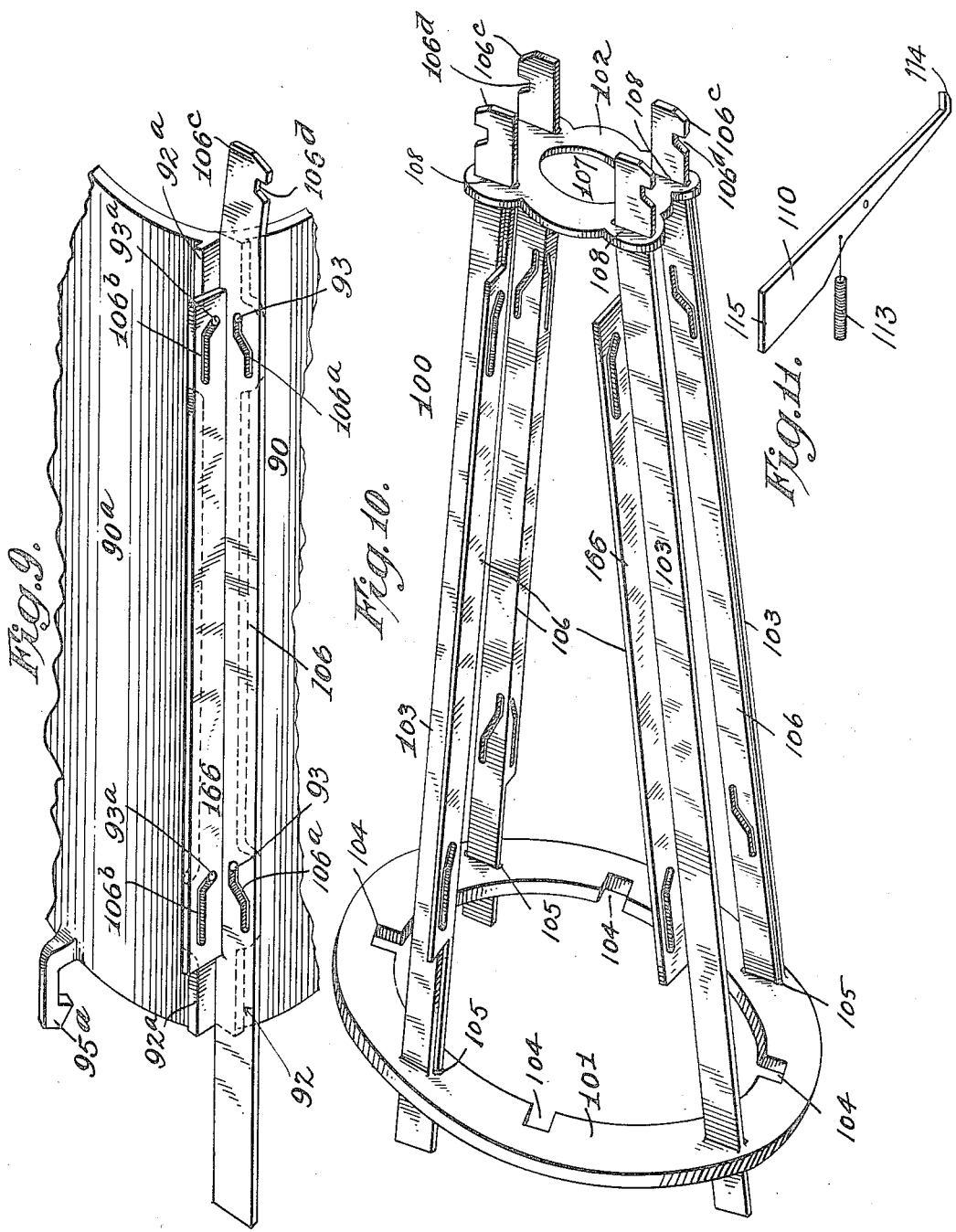

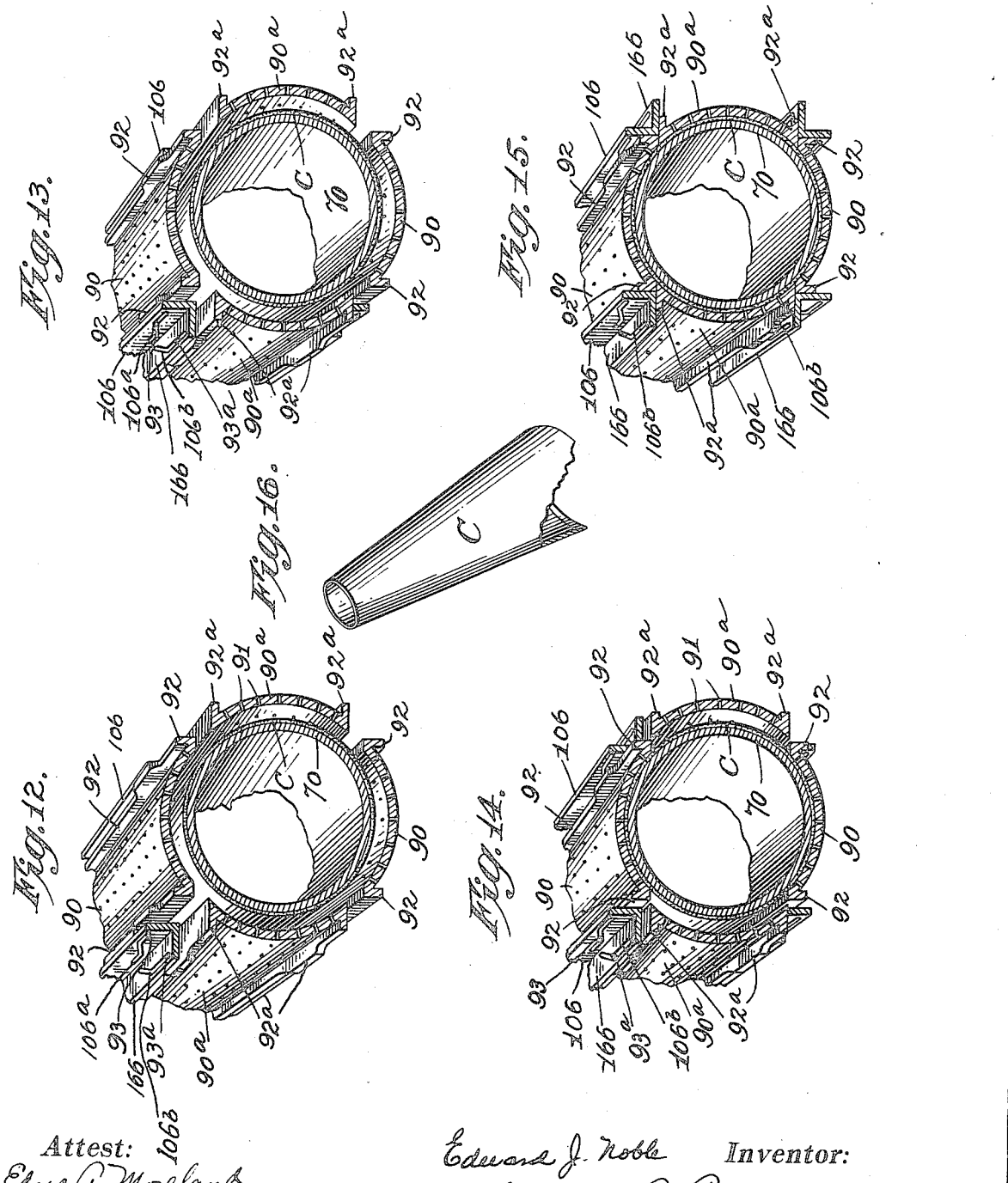

EDWARD J. NOBLE, OF NEW YORK, N. Y.

MOLD FOR PLASTIC MATERIALS.

1,146,811.                          Specification of Letters Patent.         Patented July 20, 1915.

Application filed August 31, 1912. Serial No. 718,002.

*To all whom it may concern:*

Be it known that I, EDWARD J. NOBLE, a citizen of the United States, residing at New York, in the county of New York and State of New York, have invented certain new and useful Improvements in Molds for Plastic Materials, of which the following is a specification.

This invention relates to molds in which to mold containers, or similar articles, from suitable plastic material.

The particular composition out of which the containers referred to are to be formed is not my invention but forms the subject matter of an application for Letters Patent of the United States of Charles S. Dolley, filed July 11, 1912, Serial No. 708,755. The ingredients consist briefly of kaolin or some other suitable inorganic silicate, wood pulp, casein, gelatin, a resinate, as sodium resinate which is soluble in water, and balata, or some other gutta gum. All of these ingredients, except the gutta gum, are first brought by any suitable means to a proper degree of comminution and are gradually combined while dry until thoroughly and uniformly mixed, when there is added to the mass a sufficient quantity of pure water to form an emulsion. The gutta gum which has previously been dissolved in a suitable solvent, is then gradually added to the mass by spraying the same in solution upon the other ingredients while they are being mixed. There is thus formed a mass of the ingredients diffused in water which are treated in the molds which form the subject matter of this application, and which molds comprise inner and outer mold members.

It will be understood, of course, that materials of similar nature may be similarly treated and that the invention does not reside merely in the application or use of the molds to the treatment of the particular composition mentioned. It can readily be applied by those skilled in the art to the treatment of similar materials having analogous characteristics.

In treating the chosen ingredients having been diffused in water, they are led into a suitable chamber or receptacle from which they are picked up and felted or transferred to the mold members hereinafter described and which are adapted to be carried by a conveying system to other mechanisms in which they are further treated. In the treatment of the particular composition referred to, after the material has been transferred to such mold members, it is subjected to treatment by three processes or in three mechanisms, viz: first, it is subjected in a suitable mechanism to a process by which the excess water is expressed from the layer of material on the molds, and the felting or compacting of the material is thus carried forward one step. Secondly, it is then conveyed to a preheating chamber in which it is heated internally and externally so as to further assist in the formation of the finished article; and thirdly, it is conveyed to a shaping machine in which it is made to assume its final shape.

A general understanding of the functions of this machine and a particular understanding of some of its parts, is necessary to the proper understanding of the construction and mode of operation of the mold members, but it may here be said that in general, this machine comprises reciprocating holders adapted to contain the outer mold members or shells. As the inner mold members are brought into the machine by a suitable conveying system which is intermittently moved through any suitable actuating mechanism, they are stopped and an outer mold member or shell made in sections is placed over the layer of material on each inner mold member where it is firmly compressed and secured in position so as finally to compel the plastic material to conform to the desired shape of the container to be made. Means are provided by which the outer mold members or shells are firmly clamped upon the inner mold members, and means are further provided by which the two mold members, with the material to be treated between them and with the mechanism to which they are attached, are conveyed away from the shaping machine proper into a finishing chamber where they are subjected to the action of heat in order properly to finish or set the material of which the containers are made. They are then automatically returned from this chamber to the shaping machine, and in this machine means are provided for automatically releasing the shells or outer molds from the inner molds and the finished containers are then ejected by proper means from the inner molds on which they have been supported.

In the drawings, Figure 1 is a front elevation of the shaping machine; Fig. 1ª is a plan of the holder disk rotating mechanism; Fig. 2 is a vertical section through one of the outer mold holders on the plane of the line 2—2 in Fig. 4; Fig. 3 is a horizontal section on the plane of the line 3—3 in Fig. 2; Fig. 4 is an end view of the holder looking to the left in Fig. 2; Fig. 5 is a section on the plane of the line 5—5 in Fig. 2; Fig. 6 is a section on the plane of the line 6—6 in Fig. 2; Fig. 7 is a view similar to Fig. 2 but showing the clamps released and shells unhooked from the inner mold; Fig. 8 is a view similar to Fig. 7 but the holder is shown as it appears in its lower position, the clamps are shown released and the holder is shown as moving back from the inner mold which has just had the shells clamped over a fresh layer of plastic material; Figs. 9 and 10 are detail perspective views of the outer mold cage and outer mold; Fig. 11 is a detail perspective view of one of the holding hooks which engage the pressure retaining bars; Fig. 12, 13, 14 and 15 are detail perspective views of the outer mold members showing their successive positions; and Fig. 16 is a perspective view of the molded container partly broken out to show its construction.

In the drawings, 1 is the bed-plate of the machine supported in any suitable manner as on legs 2.

3 is a gear wheel mounted on a crank shaft 4 suitably mounted to revolve in bearings in the bed-plate 1 and having diametrically opposed cranks 5 to which are pivoted connecting rods 6, the other ends of which in turn are pivoted to carriages 20 adapted to be reciprocated above the bed-plate. The gear wheel 3 meshes with a pinion 7 mounted on a stub shaft 8 adapted to revolve in bearings in the bed-plate 1, and is connected to a spiral gear mounted on this same shaft 8 which meshes with a worm gear 10 mounted on a main driving shaft 11 suitably secured in bearings 12 and having a pulley 13 mounted thereon at a suitable place.

Each reciprocating carriage 20 comprises a rectangular sub-frame adapted to reciprocate in slideways 14 supported upon and secured to the bed-plate 1. Each carriage is adapted to receive a hollow cylindrical shaft 21 secured against rotation by set screws 22 and having rotatably mounted on its inner end a disk 40 on which are mounted a pair of hollow conical outer mold holders 50 diametrically placed on the disk. Slidably mounted within the hollow shaft 21 is a second hollow shaft 24 within which is yet a third shaft 23. The inner ends of the shafts 24 and 23 are respectively pivoted to forked levers 67 and 67ª pivoted on the disk 40. The outer ends of the shafts 23 and 24 are turned to form hooks 23ª and 24ª which are adapted, when the carriage 20 is reciprocated, to engage cams 15 and 15ª which are secured to a transverse shaft 16 suitably mounted in bracket bearings 17 and which cams are connected to the driving shaft by bevel gears 18 and 19. Each of these cams has a high point.

At the center of the machine there is arranged a double track 32, only part of which is shown. This track is adapted to support a pair of arbors or short shafts 33, on each end of which are mounted inner molds 70 which are conveyed along the tracks 32 by means of a suitable conveyer hereinafter described.

Means are provided for rotating the disk 40 intermittently. These comprise a gear 25 which is mounted on the shaft 11 and which gear meshes with a similar gear 26 secured to a counter-shaft 27 directly back of the shaft 11, and on the end of which counter-shaft is secured a cam disk 28. The periphery of the disk 40 is provided with teeth 41 which mesh with a pinion 30 slidably mounted on a shaft 29, on the outer end of which is mounted to rotate idly one member 310 of a clutch, the other member 320 of which is slidably secured to the shaft 29. The member 310 is constantly rotated by means of a belt 321 actuated from a pulley 323 secured to the shaft 11. A spring 34 tends constantly to force the member 320 of the clutch into engagement with the member 310, both of these members being provided with slanting teeth adapted to engage in one direction only. The member 320 is provided with a feathering disk 35, the inner end of which is in contact with the outer edge of the cam disk 28. This cam disk is provided with a recess 280 in its periphery so that when this recess reaches the feathering disk 35 in the course of its rotation, the clutch member 320 is forced into engagement with the clutch member 310 through the action of the spring 34, and through the train of mechanisms described the disk 40 is rotated a half turn.

It will be evident that when the crank shaft 4 is rotated, each carriage 20 with its disk 40 carrying its holder 50 will reciprocate in the ways 14, on each side of the machine. As the hollow conical holders move forward to the center of the machine, the end of the stroke will bring them in such a position that they surround the molds on the track 32. The two upper holders will surround the inner and outer molds which have been through the finishing chamber, and the two lower holders will surround the inner molds upon which has been deposited the material to be molded and treated. It is evident that as the disks 40 are reciprocated, the pinion 30 must be kept in engagement with the teeth 41 on the edges of these disks. Consequently, guard plates 31 are placed on both sides of each pinion 30 and are adapted to overlap the teeth 41 and thus prevent the disengagement of the pinion teeth from those of the disk and cause the pinions 30 to slide along the shafts 29 on which they are mounted. It is also evident that the holder disk must be stopped at the end of its inward reciprocation and while the holders are surrounding the inner molds, in order to give time for the operations of clamping the outer mold upon the inner mold, or removing the outer mold from the inner mold, to take place. To that end, not only are means provided for reciprocating the carriages 20, as is above described, but means are also provided for bringing the carriages to rest at the end of each of such reciprocations and maintaining them there a proper length of time. To that end, a clutching mechanism is employed which will now be described. The gear wheel 3 is loosely mounted to rotate on the crank shaft 4. On one side, its hub is extended to form one member 551 of a clutch, the edge of which is provided with sloping teeth 552. Alongside of the gear 3 and on the same shaft is mounted a disk 553 having a beveled edge 554 and which, being secured firmly to the shaft 4, rotates with it, but which is adapted to slide longitudinally on the shaft being secured by a key. The hub of this disk is extended to form a second member 557 of the clutch above referred to, and its periphery is provided with sloping teeth 558 adapted to engage the teeth 552 above referred to. A compression spring 559 tends to press the disk 553 toward the gear 3 and promote the engagement of the clutch member as described.

A gear 560 (see Fig. 1ª) is mounted on a shaft 561 adapted to rotate in bearings in the frame of the machine and is in constant mesh with the gear 3. Also mounted on this same shaft 561 is a cam disk 562 having arranged at diametrically opposite places on its edge, inwardly projecting cam surfaces 563. This disk is so placed that its edge overlaps the edge of the disk 553, and when it rotates, twice in each revolution as the cam surfaces 563 contact with the disk 553, the latter is moved against the tension of the spring 559 and its clutch member is moved out of engagement with the clutch member on the gear 3, and while so out of engagement, the power of the main shaft 11 is not transmitted to the crank shaft 4, and the carriages 20 are at rest, and this period of rest occurs at the end of each stroke or reciprocation of the carriage due to the diametrically opposite positions of the cam surfaces 563.

Each outer mold comprises four perforated shells 90, 90, and 90ª, 90ª, which taken together form a complete frustum of a cone. The lower holders contain the shells which are to be clamped over the fresh material on the inner molds, while the upper holders are provided with means to remove the shells of the outer molds from the finished containers. After the holders have remained in their innermost position long enough to admit of the performance of the functions of clamping the outer molds of one pair of inner molds, and simultaneously removing the outer molds from the other pair of inner molds, they are moved back by the reciprocation of the disks 40 which has been above described, and these disks with the holders 50 attached thereon are then caused to revolve a half turn as has been above described. This movement brings the holder which was formerly uppermost into its diametrically opposite lowermost position and in line with the new inner mold which has been brought into the proper engaging position by the conveying system.

In Figs. 2 and 3 there is shown a holder in an engaging position with the mold members. Each holder 50 comprises a casing 51 which is substantially octagonal in section at its inner end and which tapers toward the opposite end, where it merges into a cylinder 52 and, as it continues, merges into a yet smaller cylinder 53 which is secured to the disk 40. Suspended within the casing 51 are two vertical clamp plates 80, and two horizontal clamp plates 80ª (see Fig. 5). The two vertical clamp plates are provided with pivots 81 which oscillate in lugs 810 on the clamp plate and are suspended from the casing 51 by pairs of toggle levers 54, each provided with a pivot 56 oscillating in a lug 55 on the outside of the casing. Each set of toggles 54 is connected by a cross bar 61 secured to them by pivots 57 and 58. The vertical clamp plates 80 are further supported by guide pins 59 which project through the casing 51 and screw into them. Compression springs 60 between the head of each pin 59 and the casing 51 tend to draw the clamps away from the center of the inner mold. The horizontal clamp plates 80ª are similarly suspended by pivots 81ª and toggle levers 54ª provided with pivots 56ª oscillating in lugs 55ª on the outside of the casing 51. Each pair of toggles 54ª is connected by a cross bar 61ª secured to them by pivots 57ª and 58ª.

The vertical clamp plates are moved to and fro with respect to the molds which they surround by means of the toggle levers 54 through a bar 62 secured at one end to the pivot 58 and at the other end to a pin 63 which is mounted in lugs 64 made integral with a cylindrical collar 65 which is slidably mounted on the reduced portion 52 of the casing 51. The collar 65 is provided with an annular flange 66 having a groove adapted to receive a pin 600 on the end of the forked lever 67 which is pivoted at 68 to the disk 40 (see Fig. 3), the other end of which lever 67 is pivoted in turn to the hollow rod 24 having the hook $24^a$ adapted to engage the cam $15^a$ (see Fig. 1). It is evident that when the hook $24^a$ engages the high point on the cam $15^a$, the rod 24 will be drawn out. This will move the lever 67 and through it the collar 64 and straighten out the toggles 54 against the tension of the springs 60. The horizontal clamp plates $80^a$ are similarly moved by a bar $62^a$ (see Fig. 3), one end of which is secured to the pivot $58^a$ and the other end to a pin $63^a$ mounted in lugs $64^a$ made integral with a grooved ring $65^a$ slidably mounted on the collar 65, and which grooved ring $65^a$ receives within its groove a pin $600^a$ on the end of the forked lever $67^a$ pivoted at $68^a$ to the disk 40, and the other end of which lever $67^a$ is pivoted to the rod 23, the hook $23^a$ being adapted to engage the cam 15 (see Fig. 1). The cam 15 is timed to move the vertical clamp plates slightly ahead of the horizontal clamp plates. Through these toggle levers, and connections reaching back to the hooks 24 and $24^a$ and cams 15 and $15^a$, the clamp plates are moved against the outer mold shells.

The inner mold 70 (see Figs. 2 and 3) consists of a hollow cone having a cylindrical portion $70^a$ at its smaller end and a cylindrical portion $70^b$ at its larger end. The portion $70^b$ is reduced to form the arbor 33 which may be integral therewith or suitably secured thereto. It is adapted to be attached to a similar inner mold on its opposite side.

Over the cylindrical portion $70^b$ there is arranged a stripping sleeve 71 having an annular flange $71^a$ adapted to be engaged by a stripping device (not shown) which pushes the sleeve outward bringing its outer edge against the end of the container C which is formed on the outer surface of this inner mold, thus giving it a push at the proper time whereby it may be easily disengaged from such inner mold 70. The sleeve 71 is also provided with a series of slots 72 in which are inserted blocks 73 to which are secured a ring 74 adapted to be engaged by hooks 95 on the end of each of the vertical shells 90 and hooks $95^a$ on the end of each of the horizontal shells $90^a$ as hereinafter described.

I will now describe the construction of the vertical and horizontal clamp plates 80 and $80^a$; the construction being the same, the description will be analogous. Each clamp plate is substantially rectangular (see Fig. 5). Their inner surfaces conform to that of the shells 90 of the outer mold. They are provided with radial partitions 82, to form air passages 83 which terminate in a common chamber 84 at the small end of the mold and which has an outlet conduit 85 adapted to be connected to a flexible pipe 86 leading to an exhaust air pump (Figs. 2, 3 and 6). A curved plate 87 attached to the inner surface of each clamp is provided with holes 88 which register with the air passages 83.

The outer mold is made up of two vertical and two horizontal shells 90 and $90^a$ respectively which are supported in a cage 100 (see Fig. 10). This cage is made up of plates or disks 101 and 102 connected by four bars 103. The plate 101 is recessed at 104 to allow the hooks 95 and $95^a$ on the ends of the shells to project through. It is further slotted at 105 to allow the pressure retaining bars 106 hereinafter described to project through and move freely therein. The plate 102 is provided with a circular opening 107 so that it will slip over the cylindrical portion $70^a$ of the inner mold 70. It is further provided with four slots 108 to allow the ends $106^c$ of the pressure retaining bars 106 to project through and move freely therein.

The vertical shells 90 and the horizontal shells $90^a$ are so shaped that each forms a quadrant of a frustum of a cone. They may be perforated with holes 91 adapted to register with the similar holes 88 in the clamp plates 80 or the holes 91 may be omitted from the shells as shown in Fig. 9, if the excess water has been removed from the material previous to its reaching this shaping machine. Each shell 90 is further provided with outwardly projecting longitudinal flanges 92, one on each side, and each flange is provided with stout outwardly projecting pins 93 adapted to engage cam slots in the pressure retaining bar 106. Each shell $90^a$ is similarly provided with outwardly projecting longitudinal flanges $92^a$ with pins $93^a$.

The pressure retaining bars 106 have been referred to above. Each one comprises a long bar, the ends of which are adapted to slide in the slots formed for that purpose in the plates 101 and 102 of the cage 100. This long bar is provided for a portion of its length well within the plates 101 and 102 with a flange 166 which is substantially at a right angle thereto. The long bar is substantially parallel with the flanges 92 of the vertical shells 90, and the flange 166 is substantially parallel with the flanges $92^a$ of the horizontal shells $90^a$. The long bar has two cam slots $106^a$ one at each end and identical in shape and adapted to be engaged by the pins 93 of the flanges 92 and the flange 166 has two cam slots $106^b$ one at each end and identical in shape and adapted to be engaged by the pins 93ª of the flanges 92ª. These cam slots 106ª and 106ᵇ differ in shape, the former having a longitudinal portion, then an inwardly inclined portion and finally a longitudinal portion, while the latter has a longitudinal portion longer than that of the slot 106ª and then an inclined portion. The consequence is that when the bars are engaged by the pins 93 and 93ª, the pins 93 of the vertical shells 90 cause the latter to be moved to contact with the layer of material on the inner mold 70 before the horizontal shells 90ª are moved to such contact. The successive positions of the four shells are illustrated in Figs. 12, 13, 14 and 15, and the positions of the pins in their respective slots are illustrated in these same figures.

The pressure retaining bars 106 are moved with respect to the cage 100 and the molds which they surround by means of a hollow spring-pressed plunger 126 supported on a hollow bearing rod 127 secured to the rear wall of the casing 51 (see Fig. 8). It is adapted to press against the ends 106ᶜ of the pressure retaining bars. Within this plunger 126 is a second hollow spring-pressed plunger 128 supported within the hollow bearing rod 127. This is adapted to abut against the plate 102 of the cage 100 serving to put a tension on the cage to press it outwardly.

The means for disengaging the outer from the inner molds is as follows: Holding hooks 110 (see Figs. 2, 3, 8 and 11) are pivoted at 111 to brackets 112 within the reduced part 52 of the casing 51. They are provided with springs 113 which tend to move them into engagement with the notches 106ᵈ of the ends 106ᵉ of the pressure retaining bars 106. Their ends are chamfered off at 114 and adapted to snap into the notches 106ᵈ. As it is necessary to release the holding hooks 110 from these notches when the shells are to remain on the outer mold, means are provided to rock the hooks on their pivots by causing their enlarged ends 115 to engage a cam surface 116 formed on a block 117 slidably mounted within the annular portion 52 of the casing 51. The block is connected to a cross-head 118 by rods 119 and the cross-head is connected by a rod 120 to one arm of a bell crank lever 121 pivoted at 122 to lugs on the inside of the reduced portion 53 of the casing 51. The other arm of the bell crank lever 121 is pivoted to a vertical rod 123 which projects through the edge of the holder 40 and terminates in a knob 124 adapted to engage a cam 224 on the frame of the machine. Springs 125 serve to restore the cam block 117 to its normal position.

The successive positions of the inner and outer molds with respect to each other and the mold holders are as follows: We will begin with the position shown in Fig. 2 which shows the molds locked together with the finished container between them and the holder surrounding them. In this position it is desired to remove the shells of the outer mold from the finished container and to leave them in the holder, and also to allow the finished container on the inner mold to be conveyed away to a point where it may be removed. The mechanism is so arranged and its operation is so timed that at this point the revolution of the cams 15 and 15ª engage them with the hooks 23ª and 24ª on the shafts 23 and 24 and move the forked levers 67 and 67ª. This causes the collar 65 to slide outwardly and actuates the toggle lever system which holds the vertical and horizontal clamp plates against the shells of the outer mold members, and the clamp plates are therefore moved away from such shells assisted by the energy stored in the springs 60. The clamps 80 and 80ª are therefore released and simultaneously as the holder moves outward and away from the mold, the hooks 95 and 95ª being engaged by the ring 74 on the mold 70, the shells 90 and 90ª are prevented from following the holder until the pins 93 and 93ª ride up in the cam slots 106ª and 106ᵇ of the pressure retaining bars, thus opening the shells so that the hooks 95 and 95ª are out of engagement with the ring 74 (see Fig. 7), the holding hooks 110 having previously engaged the notches 106ᵈ of the pressure retaining bars 106 so that the latter have been prevented from moving, and the holder continues its outward stroke carrying the shells with it as above.

At the end of its outward stroke, the disk 40 with its holders is revolved one-half turn through the pinion 30 and teeth 41 bringing the same holder in line with the lower portion of the conveyer on which there has been brought into position another inner mold 70 covered with a fresh supply of the material to be formed into a container. This position is shown in Fig. 8. The holder then moves forward on its carriage and when it has about completely enveloped the inner mold 70, the clamps 80 and 80ª begin to close in, pushing the shells 90 and 90ª with them through the medium of the cam 15 and 15ª while the plunger 126 presses on the ends of the pressure retaining bars 106 and causes the cam slots 106ª and 106ᵇ to take up the movement of the pins 93 and 93ª due to the movement of the shells and clamps until the maximum pressure has been attained when the shells of the outer mold are securely locked over the inner mold. Just at this instant, the knob 124 on the rod 123 engages the cam 224 on the frame of the machine and this, through the mechanism heretofore described, unlocks the hooks 110 from the notches 106ᵈ of the pressure retaining bars 106 so that the cage 100 and the shells of the outer mold locked on the inner mold therein are free to separate from the holder; but the hooks 95 on the shells 90 and 90ᵃ are now engaging the flange 74 on the inner mold; consequently, when the holder moves outwardly again it leaves the molds locked together. The outer mold and the material compressed between its inner and outer members is then conveyed to the finishing chamber, or elsewhere, by the conveyer and brought back again into a position opposite the upper holder where the shells of the outer mold are removed from the inner mold in the manner heretofore described.

What I claim is:

1. An outer mold comprising a series of sections each capable of movement with respect to a common center, each provided with flanges extending in the direction of such movement, and a bar adjacent to the adjacent flanges of adjacent sections, said adjacent flanges having projecting pins and the bar coöperating with the same having cams with which the pins are adapted to engage.

2. An outer mold comprising a series of sections each capable of movement with respect to a common center, each provided with flanges extending in the direction of such movement, bars adjacent to the flanges of adjacent sections each flange having projecting pins and each bar having cams with which the pins are adapted to engage, the cams adapted to engage the pins of one section being different from those adapted to engage the pins of the adjacent section.

3. An outer mold comprising a series of sections each capable of movement with respect to a common center, each provided with flanges extending in the direction of such movement, and a bar adjacent to the adjacent flanges of adjacent sections such flange having projecting pins and each bar having cams with which the pins of both flanges are adapted to engage, the cams adapted to engage the flanges lying in the same direction being alike.

4. An outer mold comprising vertical sections each with vertical flanges, and horizontal sections each with horizontal flanges, in combination with a series of pressure retaining bars each adapted to engage both the horizontal and vertical flanges of adjacent sections, each bar having a horizontal and vertical portion, the horizontal portion being adjacent to the horizontal section flanges and the vertical portion being adjacent to the vertical section flanges, the section flanges having pins and the pressure bars having coöperative cam slots.

5. An outer mold comprising vertical sections each with vertical flanges, and horizontal sections each with horizontal flanges, in combination with a series of pressure retaining bars each adapted to engage both the horizontal and vertical flanges of adjacent sections, each bar having a horizontal and vertical portion, the horizontal portion being adjacent to the horizontal section flanges and the vertical portion being adjacent to the vertical section flanges, the section flanges having pins and the pressure bars having coöperative cam slots the slots in the vertical portion differing in position from those in the horizontal portion.

6. An outer mold comprising vertical sections each with vertical flanges, and horizontal sections each with horizontal flanges, in combination with a series of pressure retaining bars each adapted to engage the horizontal and vertical flanges of adjacent sections, each bar having a horizontal and vertical portion, the horizontal portion being adjacent to the horizontal section flanges and the vertical portion being adjacent to the vertical section flanges, the section flanges having pins and the pressure bars having coöperative cam slots the slots in the vertical portion differing in position from those in the horizontal portion, whereby the movement of the pressure bars will move the horizontal and vertical sections at different times.

7. The combination with an inner mold and an outer mold of clamps adapted to press against the outer mold and means for moving the clamps to and from the outer mold, comprising a holder for the clamps, means for reciprocating it longitudinally of the molds and a series of levers mounted on the holder actuated to move the clamps by the mere reciprocation of the holder.

8. The combination with an inner mold and an outer mold of clamps adapted to press against the outer mold and means for moving the clamps to and from the outer mold, comprising a holder for the clamps, means for reciprocating it longitudinally of the molds and a series of toggle levers adapted to move the clamps.

9. In combination, inner and outer molds, a series of clamps for each pair of molds, a holder for the clamps, springs tending constantly to move the clamps away from the molds and levers secured to the clamps adapted to counteract such pressure.

10. In combination, inner and outer molds, a series of clamps for each pair of molds, a holder for the clamps, toggle levers adapted to close the clamps and springs adapted to open them.

11. In combination an inner mold, an outer mold in sections, locking bars adapted to engage the sections to move some sections before the others, clamps for the outer molds and means for moving the bars and the clamps.

12. In combination an inner mold, an outer mold in sections, locking bars for the sections adapted to engage the sections to move some sections before the others, clamps for the outer molds and means for moving the bars and the clamps comprising toggle levers for the clamps.

13. In combination an inner mold, an outer mold in sections, bars adapted to engage the sections to move some sections before the others, clamps for the outer molds and means for moving the bars and the clamps, comprising hooks to pull the bars in one direction and a sliding member to push them in the opposite direction.

14. In an apparatus of the kind described outer mold clamps in pairs, each pair provided with supporting levers, means for reciprocating the clamps and levers bodily and means for operating the levers to move one pair of clamps before the other.

15. In an apparatus of the kind described outer mold clamps in pairs, each pair provided with supporting levers, means for reciprocating the clamps and levers bodily and means for operating the levers to move one pair of clamps before the other, comprising two sliding members one connected with each lever system.

16. In an apparatus of the kind described outer mold clamps in pairs, each pair provided with supporting levers, means for reciprocating the clamps and levers bodily and means for operating the levers to move one pair of clamps before the other, comprising two sliding members one connected with each lever system and adapted to be moved one before the other.

17. In an apparatus of the kind described outer mold clamps in pairs, each pair provided with supporting levers, means for reciprocating the clamps and levers bodily and means for operating the levers to move one pair of clamps before the other, comprising two sliding members one connected with each lever system and adapted to be moved one before the other by the same reciprocation.

18. In combination a relatively stationary inner mold and movable outer mold holder, an outer mold, means for reciprocating the holder, a cage for the outer mold and means for detaching the outer mold and cage from the holder and attaching them to the inner mold actuated by the mere reciprocation of the holder.

19. In combination a relatively stationary inner mold and movable outer mold holder, an outer mold, means for reciprocating the holder, a cage for the outer mold and means for detaching the outer mold and cage from the holder and attaching them to the inner mold, and means for clamping the inner mold against the outer mold.

20. In combination a relatively stationary inner mold and movable outer mold holder, an outer mold, means for reciprocating the holder, clamps secured to the holder and adapted to move to and from the outer mold, a cage for the outer mold, means for placing the outer mold over the inner mold without removing it from the cage, means for moving the clamps while the outer mold is so placed, means for releasing the clamps and means for detaching the cage and outer mold from the holder.

21. In combination a relatively stationary inner mold and movable outer mold holder, an outer mold, means for reciprocating the holder, clamps secured to the holder and adapted to move to and from the outer mold, a cage for the outer mold, means for placing the outer mold over the inner mold without removing it from the cage, means for moving the clamps while the outer mold is so placed, means for releasing the clamps and means for detaching the cage and outer mold from the holder and means for attaching the same to the holder and simultaneously detaching them from the inner mold.

22. In combination an inner mold, an outer mold made in sections, each section having a hook at one end, an annulus encircling the inner mold and means for engaging section hooks with the annulus.

23. In combination an inner mold, an outer mold made in sections, each section having a hook at one end, an annulus encircling the inner mold and means for engaging section hooks with the annulus and disengaging them therefrom.

24. In combination an inner mold, an outer mold made in sections, each section having a hook at one end, an annulus encircling the inner mold and means for engaging section hooks with the annulus actuated by the relative longitudinal movement of the inner and outer molds.

25. In combination an inner mold, an outer mold made in sections, each section having a hook at one end, an annulus encircling the inner mold and means for engaging section hooks with the annulus and disengaging them therefrom actuated by the relative longitudinal movement of the inner and outer molds.

26. In combination with an inclosing member, of a sectional mold located therein, means interposed between the mold sections and the inclosing member for moving the sections toward each other, and devices detachably connecting the sections for holding them together.

27. In combination with an open ended inclosing member, of a sectional mold movable into and out of the open end thereof, means within the member that detachably bears against the mold sections for moving them inwardly to an assembled relation, and devices detachably connecting the sections and removable therewith for holding the mold in assembled relation.

28. In combination with a mold, comprising separable sections, of means engaging the same for moving them to an assembled relation, means that detachably connect the sections for securing them together and permitting the bodily detachment of the assembled mold from the moving means, and means detachably engaging the securing means for operating the same.

In testimony whereof I affix my signature in presence of two witnesses.

EDWARD J. NOBLE.

Witnesses:
ALAN C. McDONNELL,
MARY H. LEWIS.

Copies of this patent may be obtained for five cents each, by addressing the "Commissioner of Patents, Washington, D. C."